June 3, 1969
D. H. VOGEL, SR., ET AL
3,447,403
ADJUSTABLE BORING UNIT
Filed June 17, 1968
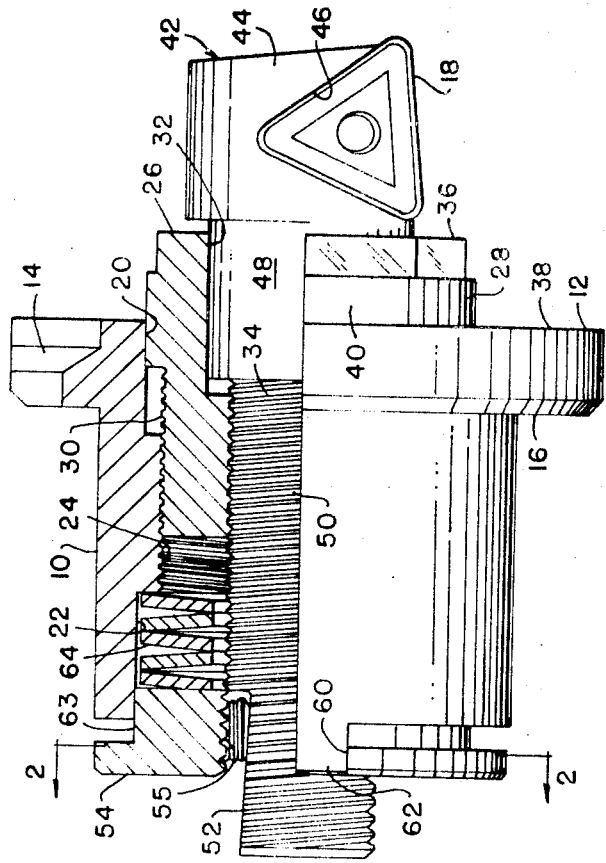
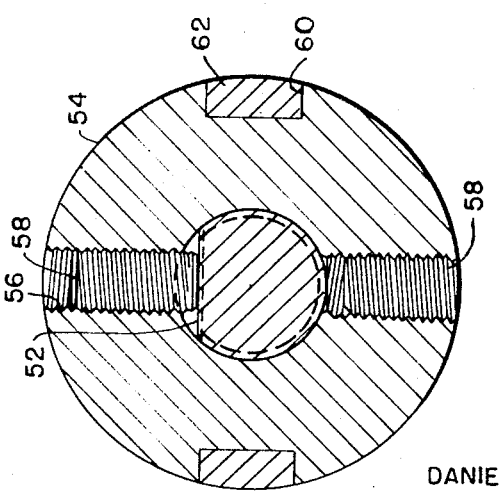
INVENTORS
DANIEL H. VOGEL, SR.
GERALD C. THERIAULT
BY *Whittemore, Hulbert & Belknap*
ATTORNEYS

United States Patent Office 3,447,403
Patented June 3, 1969

3,447,403
ADJUSTABLE BORING UNIT
Daniel H. Vogel, Sr., and Gerald C. Theriault, Washington, Ill., assignors to Allegheny Ludlum Steel Corporation, Pittsburgh, Pa., a corporation of Pennsylvania
Filed June 17, 1968, Ser. No. 737,448
Int. Cl. B23b 47/00
U.S. Cl. 77—58         14 Claims

ABSTRACT OF THE DISCLOSURE

A boring unit for insertion into a recess in a boring bar or the like including high precision differential thread adjustment means together with spring biasing means to provide for adjustment of a cutting insert with the capability of retaining the exact adjusted position.

Field of the invention

The invention relates to cutting tools in which a tool carrier containing a cutting insert is adjustable with high precision relative to a holder adapted to be carried by a tool drive member such for example as a boring bar. The holder may be detached from the boring bar or the like, and a relatively coarse adjustment made of the insert support.

Summary of the invention

Described in general terms, the invention comprises a cartridge body, preferably of tubular configuration and internally threaded which is adapted to be seated in a recess in a tool drive member such for example as a boring bar. The cartridge body has a flange engageable with a locating surface on the boring bar or the like, and is adapted to be clamped in position by screws. The carrier for the cutting element, which may be a carbide insert, is externally threaded. An internally and externally threaded micro-adjusting sleeve is interposed between the cartridge body and the tool carrier in threaded engagement with both. A collar is threaded to the tool carrier and has slots extending into which tangs on the cartridge body extend to provide for axial movement of the tool carrier while preventing rotation thereof relative to the cartridge body. The collar has a set screw engageable against a flat surface on the tool carrier, which when loosened permits the threaded tool carrier to be adjustable relative to the adjusting sleeve.

It is accordingly an object of the present invention to provide a high precision adjustable tool carrier including differential screw means for effecting fine adjustment thereof.

It is a further object of the present invention to provide an internally threaded cartridge body for insertion in fixed position into a recess in a tool drive member such as a boring bar, an internally and externally threaded sleeve in said cartridge body, a threaded tool carrier in said sleeve, means for retaining said tool carrier against rotation relative to said cartridge body, and means for effecting rotation of the sleeve to effect precision adjustment of the tool carrier.

It is a further object of the present invention to provide a cartridge as set forth in the foregoing comprising resilient means interposed between the cartridge body and the threaded tool carrier to eliminate backlash between the threads of said cartridge body, adjusting sleeve and tool carrier.

Other objects and features of the invention will become apparent as the description proceeds, especially when taken in conjunction with the accompanying drawing, illustrating a preferred embodiment of the invention.

Brief description of the drawing

FIGURE 1 is a side elevation of the cartridge assembly, partly in section.

FIGURE 2 is a full section on the line 2—2, FIGURE 1.

Description of the preferred embodiment

The cartridge assembly shown in the figures comprises a generally cylindrical cartridge body 10 having a radially extending flange 12 provided at at least two points in its periphery with generally circular recesses 14 for the reception of the heads of attached screws.

It is to be understood that the inner surfaces 16 of the flange 12 locate against surfaces provided around a recess into which the cartridge body 10 is inserted. Accordingly, in use the cartridge body 10 occupies a definite fixed position relative to the boring bar or other tool driving member with which it is associated.

Depending upon the particular use which the cutting insert 18 is intended to perform, the recess in the tool driving member may extend radially from its axis of rotation or may be positioned obliquely with respect thereto.

The cartridge body 10 is provided with counterbores 20 and 22 at opposite ends thereof, and intermediate the counterbores the cartridge body is internally threaded as indicated at 24.

A precision adjustment sleeve 26 is provided with a cylindrical piloting surface 28 which is slidable in the counterbore 20 of the cartridge body 10. Beyond the pilot 28 the sleeve 26 is externally threaded as indicated at 30 and is threadedly engaged with the threaded portion 24 of the cartridge body 10.

The adjusting sleeve 26 is provided at its interior with a counterbore 32, the remainder of the opening through the sleeve 26 being interiorly threaded as indicated at 34. Beyond the pilot 28 the sleeve 26 is provided with a noncircular surface 36 which for example may be hexagonal for engagement with a suitable adjusting tool.

The outer surface 38 of the flange 16 is provided with circumferentially arranged graduations and the pilot surface 28 is provided with a single graduation or zero indication indicated at 40.

An elongated tool carrier indicated generally at 42 is provided having a head 44 with a locating recess 46 therein for the reception of a suitable cutting insert such for example as indicated at 18. Beyond the head 44 of the tool carrier there is provided a cylindrical pilot portion 48 which is slidably associated with the piloting surface of the counterbore 32. Beyond the pilot portion 48 the tool carrier is reduced as illustrated and is externally threaded as indicated at 50 for threaded engagement with the threads 34 of the adjusting sleeve 26.

Adjacent the end of the tool carrier opposite the head 44 there is provided a flat locating surface 52 which as illustrated, is inclined at a slight angle outwardly toward the rear of the tool carrier. For example, this surface may be inclined at an angle of approximately three degrees to the axis of the tool carrier. An internally threaded pressure ring 54 is provided having internal threads 55 engaged on threads 50, and radially threaded openings 56 which receive set screws 58 one of which is engageable with the flat surface 52. The ring 54 is provided with a pair of notches 60 and the end of the cartridge body 10 opposite to its flange 14 is provided with a pair of axially extending tangs 62 adapted to extend into the notches 60 so as to prevent rotation between the pressure ring 54 and the cartridge body 10. Accordingly, when one of the set screws 58 is advanced into clamping engagement with the flat surface 52, the tool holder or carrier 42 is held against rotation relative to the cartridge body 10.

Received within the counterbore 22 and bearing against the shoulder at the inner end thereof is an assembly of relatively strong Belleville springs 64. The strength of these springs is sufficient to take up all backlash between all of the threads previously described and to retain the tool carrier 42 in positively fixed position against displacement as a result of any forces developed by the cutting operation.

The threads 24 and the threads 50 and the associated outer and inner threads on the sleeve 26, are selected so as to provide an exceedingly fine and precise adjustment of the tool carrier 42 upon rotation of the adjusting sleeve, as by the application of a wrench to the non-circular surface portion 36 thereof. For example, the threads 24 may be 5/8" pitch diameter, 40 threads per inch; whereas, the threads 50 on the tool holder or carrier 42 may be 5/16" pitch diameter, 32 threads per inch. Accordingly, when the cartridge assembly as shown in FIGURE 1 has been inserted in the recess and locked in position by set screws, the heads of which engage in the peripheral recesses 14, fine adjustment of the tool carrier 42 may be made by rotation of the adjusting sleeve 26. Inasmuch as the resilient spring means 64 constantly biases the pressure ring 54 and tool carrier 42 to the left as seen in FIGURE 1, all of the backlash between the threads 24, 30, 34 and 50 will be taken up and accordingly adjustment of the sleeve 26 is effective to move the tool carrier 42 and related cutting insert 18 to the precise position desired, and when the sleeve is released, the cutting insert will remain in the precise position to which it was moved. In other words, there will be no further displacement of the cutting insert 18 as might be occasioned by tightening a clamp member which had been released to permit adjustment of the insert.

When it is desired to position to cutting insert 18 beyond the relatively small range of adjustment permitted by rotation of the sleeve 26, the set screw 58 may be released and the insert holder rotated in increments of 180 degrees to position the cutting insert 18 in the approximately required position. This of course is accomplished by removal of the cartridge assembly from the recess in the boring bar or the like. After the coarse adjustment has been accomplished the cartridge assembly is reinserted and will assume its precise position as a result of its locating surface 16 against a corresponding locating surface on the boring bar. Thereafter, rotation of the adjusting sleeve 26 will bring the cutting insert 18 to precisely the required position.

The drawing and the foregoing specification constitute a description of the improved adjustable boring unit in such full, clear, concise and exact terms as to enable any person skilled in the art to practice the invention, the scope of which is indicated by the appended claims.

What we claim as our invention is:

1. A precision adjustable cartridge assembly comprising an internally threaded cartridge body, an internally and externally threaded adjustment sleeve threaded into said cartridge body, an externally threaded carrier for a cutting tool threaded within said threaded sleeve, means acting between said tool carrier and said cartridge body to prevent relative rotation therebetween while providing for axial movement of said carrier relative to said body, the external and internal threads of said sleeve and the internal threads on the cartridge body and the external threads on the tool carrier being of different pitch to provide for relatively small axial advance of said tool carrier upon rotation of said sleeve.

2. A cartridge assembly as defined in claim 1 wherein the means acting between the carrier and body comprises a ring threaded to said carrier and having a set screw engaging said carrier to prevent rotation between said ring and carrier, and tang and notch means between said ring and body to prevent relative rotation therebetween while providing for relative axial movement therebetween.

3. A cartridge assembly as defined in claim 2 in which said carrier is provided with a radially facing substantially flat surface adjacent its rear end against which the set screw carried by said ring engages.

4. An assembly as defined in claim 3 in which said flat surface is inclined rearwardly and outwardly from the axis of the threaded portion of said carrier at a small angle.

5. A cartridge assembly as defined in claim 2 comprising resilient means interposed between said cartridge body and said ring effective to take up backlash between all of the threads and to retain said carrier against displacement by forces developed during a cutting operation.

6. A cartridge assembly as defined in claim 5 in which said resilient means comprises an assembly of Belleville springs.

7. A cartridge assembly as defined in claim 2 in which said cartridge body is provided with an enlarged counterbore at the end thereof opposite the cutting tool, said ring having a cylindrical pilot portion slidable in said counterbore, said resilient means being interposed between the bottom of said counterbore and the pilot portion of said pressure ring.

8. A cartridge assembly as defined in claim 7, said cartridge body having a piloting recess at its forward end, said sleeve having a cylindrical piloting enlargement slidably received in said piloting recess.

9. A cartridge assembly of the character described comprising a generally cylindrical cartridge body having an opening extending axially therethrough, the intermediate portion of said opening being internally threaded, cylindrical counterbores at both ends thereof, an externally and internally threaded sleeve having its inner end threadedly engaged with the threads in said cartridge body, the outer end of said sleeve having an enlarged cylindrical pilot portion slidable in the counterbore provided at one end of said cartridge body, the portion of said sleeve outward from said cylindrical pilot portion being of non-circular peripheral shape for engagement by an adjusting tool, said sleeve having internal threads at its inner end and being provided internally at its outer end with an enlarged counterbore, a tool carrier having an outer head for carrying a cutting tool such as an indexable insert, a cylindrical pilot portion received in the counterbore at the outer end of said sleeve, and a reduced threaded shank engaged with threads at the interior of said sleeve, means at the inner end of said carrier interposed between said carrier and said cartridge body effective to prevent relative rotation between said carrier and cartridge body while providing for relative axial movement therebetween, the threads at the interior and exterior of said sleeve being of different pitch to effect extremely fine adjustment axially of said tool carrier upon rotation of said sleeve.

10. An assembly as defined in claim 9 in which the means interposed between the threaded end of said carrier and said cartridge body comprises a pressure ring having a cylindrical pilot portion received in the counterbore at the adjacent end of said cartridge body, tang and slot connections between the pressure ring and the adjacent end of the cartridge body to prevent relative rotation therebetween, and relatively strong resilient means in the last mentioned counterbore engaging the inner end of the pilot portion of said pressure ring.

11. An assembly as defined in claim 10 in which said pressure ring is internally threaded and is threadedly engaged on the threads of said tool carrier, and a set screw carried by said pressure ring engageable with said carrier to prevent rotation between said carrier and said pressure ring.

12. An assembly as defined in claim 11 in which the threaded portion of said carrier is provided with a substantially flat surface at one side thereof, and the set screw carried by said pressure ring is engageable with said flat surface.

13. An assembly as defined in claim 12 in which said pressure ring is provided with two diametrically opposed threaded radial openings with set screws therein to provide for incremental relatively coarse adjustment of said tool carrier by effecting rotation thereof in steps of 180 degrees.

14. An assembly as defined in claim 10 in which said resilient means take up thread clearance in a direction such that cutting thrust is opposed by solid thread contact.

References Cited

UNITED STATES PATENTS

| | | | |
|---|---|---|---|
| 2,959,991 | 11/1960 | Nixon | 77—58 |
| 3,347,115 | 10/1967 | Koch | 77—58 |
| 3,349,648 | 10/1967 | Holloway | 77—58 |

GERALD A. DOST, *Primary Examiner.*